United States Patent [19]

Sugano et al.

[11] Patent Number: 5,617,338

[45] Date of Patent: Apr. 1, 1997

[54] METHOD OF AND SYSTEM FOR ELECTRICALLY PROCESSING VACUUM PRESSURE INFORMATION SUITABLE FOR USE IN VACUUM UNIT

[75] Inventors: Shigeru Sugano; Takashi Takebayashi; Shigekazu Nagai; Yoshiharu Ito; Mitsuhiro Saito; Hiroshi Matsushima; Akio Saitoh, all of Ibaraki-ken, Japan

[73] Assignee: SMC Kabushiki Kaisha, Tokyo, Japan

[21] Appl. No.: 618,273

[22] Filed: Mar. 18, 1996

Related U.S. Application Data

[63] Continuation of Ser. No. 345,340, Nov. 21, 1994, abandoned, which is a continuation of Ser. No. 941,219, Sep. 4, 1992, abandoned.

[30] Foreign Application Priority Data

Sep. 6, 1991 [JP] Japan .................................. 3-226310

[51] Int. Cl.$^6$ .................................................. G01L 9/00
[52] U.S. Cl. ................... 364/558; 73/37; 340/626
[58] Field of Search ................... 364/558, 550, 364/551.01; 73/49.2, 1 R, 4 R, 4 V, 37; 340/626

[56] References Cited

U.S. PATENT DOCUMENTS

| | | | |
|---|---|---|---|
| 4,378,523 | 3/1983 | Norman | 73/4 V X |
| 4,489,305 | 12/1984 | Lang et al. | 340/626 X |
| 4,668,948 | 5/1987 | Merkel | 73/37 X |
| 4,744,036 | 5/1988 | Van Tiggelen | 364/558 X |
| 4,942,758 | 7/1990 | Cofield | 73/49.2 |
| 5,117,675 | 6/1992 | Notoyama et al. | 73/37 |
| 5,279,147 | 1/1994 | Bertini et al. | 73/37 X |
| 5,295,392 | 3/1994 | Hensel et al. | 73/37 |

FOREIGN PATENT DOCUMENTS

| | | |
|---|---|---|
| 2916550 | 10/1979 | Germany . |
| 3246095 | 7/1983 | Germany . |
| 402574 | 2/1991 | Germany . |

Primary Examiner—Ellis B. Ramirez
Assistant Examiner—Eric W. Stamber
Attorney, Agent, or Firm—Oblon, Spivak, McClelland, Maier & Neustadt, P.C.

[57] ABSTRACT

A method of and a system for electrically processing vacuum pressure information, which is suitable for use in a vacuum unit. Pressure values are detected and a desired pressure value lower than the highest vacuum pressure value of the detected pressure values is displayed on a displaying device in digital form. The desired pressure value is stored in a storing device. Each of pressure values relative to vacuum, which are detected by a pressure detecting element held in front of a passage communicating with a vacuum port, is converted into a digital signal. The so-converted digital signal is digitally displayed on the displaying device. The desired pressure value stored in the storing device is compared with each of the detected pressure values relative to the vacuum, and information about faulty points is displayed on the displaying device based on the result of comparison.

9 Claims, 11 Drawing Sheets

METHOD OF AND SYSTEM FOR ELECTRICALLY PROCESSING VACUUM PRESSURE INFORMATION SUITABLE FOR USE IN VACUUM UNIT

This application is a continuation of application Ser. No. 08/345,340, filed on Nov. 21, 1994, now abandoned, which is a continuation of application Ser. No. 07/941,219, filed on Sep. 4, 1992, also abandoned.

BACKGROUND OF THE INVENTION

1. Field of the Invention

The present invention relates to a method of and a system for electrically processing vacuum pressure information, which is suitable for use in a vacuum unit.

2. Description of the Related Art

A vacuum unit is used in a state in which it has been coupled to a suction pad or cup for attracting a work and feeding the same, for example. In this case, a pressure switch is disposed in the vacuum unit and detected pressure values is then compared with a preset pressure value to thereby determine whether or not the work has been attracted by the suction cup. There is also known a vacuum unit of a type wherein a failure in the operation of the vacuum unit is detected to thereby produce a failure signal and visually display the same.

In this type of vacuum unit, however, the reason that a desired vacuum pressure value cannot be obtained can be based on various factors. For example, it is realized that even mere clogging due to dust or the like included in a fluid tends to be developed in a directional control valve, an ejector, a filter or a silencer or the like. It is thus difficult to specify failure or faulty points and quickly replace parts with others so as to restart the vacuum unit even if a failure signal is produced.

SUMMARY OF THE INVENTION

It is a general object of the present invention to provide a method of and a system for electrically processing vacuum pressure information, which is employed in a vacuum unit, wherein a desired pressure value can be set in a relatively simple manner and failure points can be visually displayed.

It is a principal object of the present invention to provide a method of and a system for electrically processing vacuum pressure information, which is employed in a vacuum unit, wherein failure points in the vacuum unit can be promptly specified and hence parts can be easily replaced by others.

It is another object of the present invention to provide a method of electrically processing vacuum pressure information, which is suitable for use in a vacuum unit, the method being executed by a vacuum control apparatus and comprising the steps of detecting pressure values, displaying a desired pressure value lower than the highest vacuum pressure value of the detected pressure values on displaying means in digital form, storing the desired pressure value in storing means, converting each of pressure values relative to vacuum into a digital signal, the pressure values being detected by a pressure detecting element held in front of a passage which communicates with a vacuum port, and thereafter digitally displaying the so-converted digital signal on the displaying means, comparing the desired pressure value stored in the storing means with each of the detected pressure values relative to the vacuum, and displaying information about failure points on the displaying means based on the result of comparison.

It is a further object of the present invention to provide a method of electrically processing vacuum pressure information wherein the desired pressure value stored in the storing means comprises a first pressure value lower than the highest vacuum pressure value, which has been determined from the detected pressure values and a second pressure value lower than the first pressure value, and a predetermined pressure width for avoiding chattering action is specified by the first and second pressure values.

It is a still further object of the present invention to provide a method of electrically processing vacuum pressure information wherein when each of the detected pressure values relative to the vacuum is lower than the desired pressure value plural times in succession upon comparison of the desired pressure value stored in the storing means with each of the detected pressure values relative to the vacuum, a failure-point indicating signal is produced as a predetermined signal.

It is a still further object of the present invention to provide a system for electrically processing vacuum pressure information, which is suitable for use in a vacuum unit activated to cause components such as a valve body, an ejector, a silencer, a filter, etc. to communicate with one another through a predetermined passage, the system comprising setting means for setting a desired pressure value, a pressure sensor disposed on either one of the upstream and downstream sides of at least one of the components, determining means for comparing a pressure value produced from the pressure sensor with the set desired pressure value to thereby determine that the vacuum unit has been brought to an improper state when the result of comparison shows a predetermined pressure value, and displaying means for displaying information about failure points thereon based on the result of comparison by the determining means.

It is a still further object of the present invention to provide a system for electrically processing vacuum pressure information wherein pressure sensors are provided on a fluid supply side corresponding to the upstream side of the ejector of the components and a fluid inlet side corresponding to the downstream side of the ejector respectively.

It is a still further object of the present invention to provide a system for electrically processing vacuum pressure information wherein the setting means is capable of setting the flow rate of air and a flow-meter is provided on the fluid inlet side corresponding to the downstream side of the ejector.

It is a still further object of the present invention to provide a system for electrically processing vacuum pressure information wherein the determining means includes means for counting the number of pressure values lower in vacuum than the set pressure value and for producing a signal indicative of an improper state when the counted number of the pressure values has reached a predetermined value.

It is a still further object of the present invention to provide a system for electrically processing vacuum pressure information, further including displaying means for digitally displaying a vacuum pressure value detected by a detecting means for detecting the vacuum pressure value.

It is a still further object of the present invention to provide a system for electrically processing vacuum pressure information, further including displaying means for digitally displaying at least a pressure value used for the determination of the improper state and a pressure value used for the failure precognition.

The above and other objects, features and advantages of the present invention will become apparent from the following description and the appended claims, taken in conjunction with the accompanying drawings in which preferred embodiments of the present invention are shown by way of illustrative example.

DETAILED DESCRIPTION OF THE PREFERRED EMBODIMENTS

A vacuum pressure information processing apparatus or system incorporated in a vacuum unit according to the present invention will hereinafter be described in detail with reference to the accompanying drawings in which preferred embodiments are shown by way of illustrative example in connection with a method of processing vacuum pressure information.

A vacuum pressure information processing system 10 incorporated in a vacuum unit according to the present invention will first be described with reference to FIG. 1.

Figure 1:
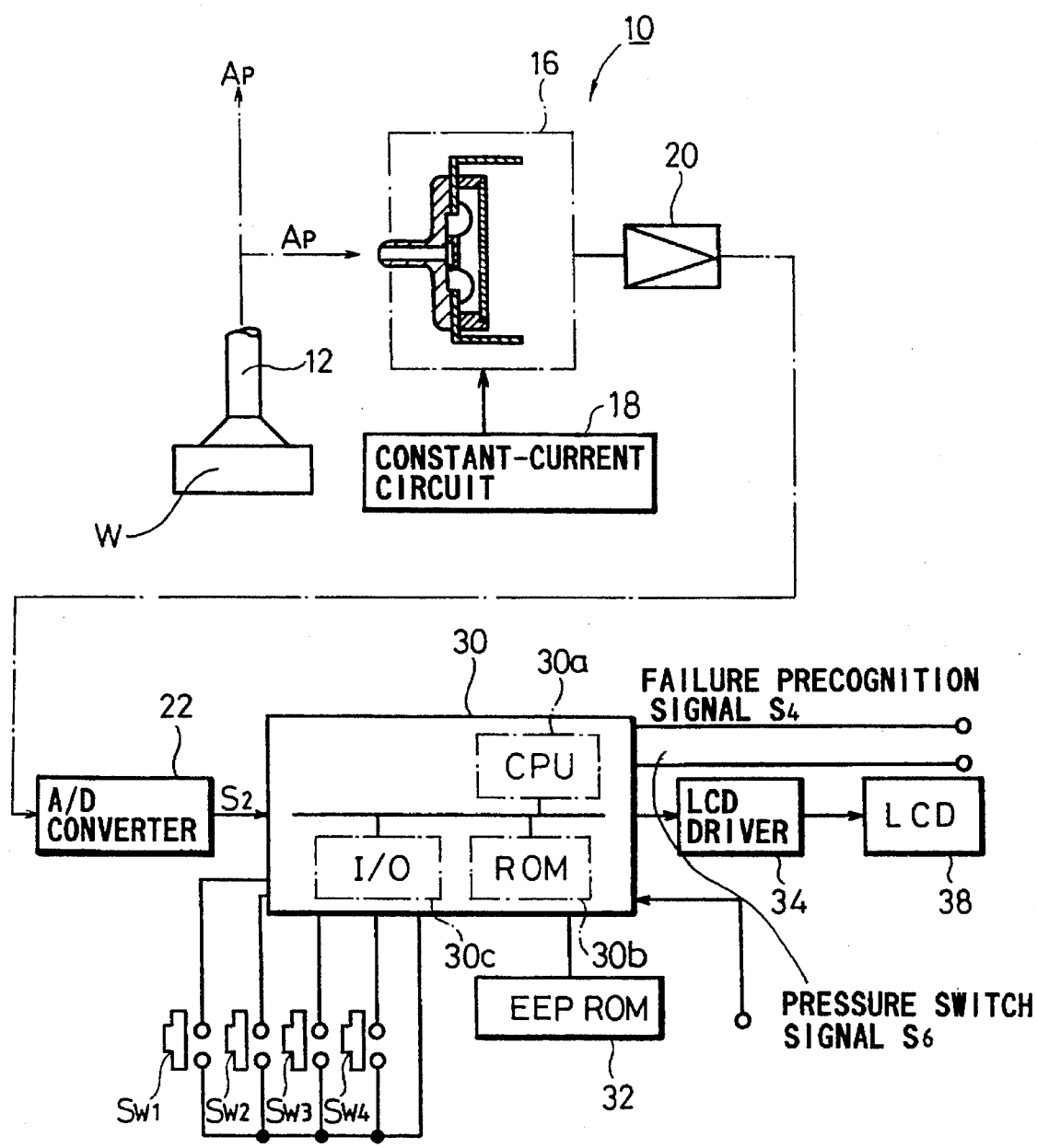
FIG. 1 is a block circuit diagram showing a vacuum pressure information processing system employed in a vacuum unit according to the present invention.

In FIG. 1, reference symbol W indicates a work and reference numeral 12 indicates a suction pad or cup (hereinafter called a "work suction cup") used to feed the work, which is mounted on a delivering means employed in a vacuum system. The pressure information processing system 10 comprises a semiconductor pressure sensor 16 for detecting the value of pressurized air Ap so as to output a detected signal therefrom, a constant-current circuit 18 and an amplifier 20. Further, the pressure information processing system 10 also includes an A/D converter 22 for converting a signal outputted from the amplifier 20, i.e., an analog signal corresponding to the value of the pressurized air Ap into a digital detection signal $S_2$, and a controller 30 comprised of a one-chip microcomputer or the like. The controller 30 is provided with a one-chip multi CPU 30a having superb high performance, a ROM 30b with a program stored therein, and an I/O 30c or the like, and includes set-value up/down switches $S_{W1}$, $S_{W2}$ each used to set a pressure value as reference, a set switch $S_{W3}$ for setting a pressure value at the time that the set value has been changed, and a reset switch $S_{W4}$ for resetting the set value, all of which are electrically connected to the controller 30. Also connected to the controller 30 are an EE($E^2$)PROM 32 capable of storing information therein and retaining the information therein when a power source is turned off, and an LCD driver 34 and an LCD 38 which are used to visually display set values and information.

The vacuum unit incorporating the pressure information processing system constructed as described above therein will now be shown in FIGS. 2 and 3.

Figure 2:
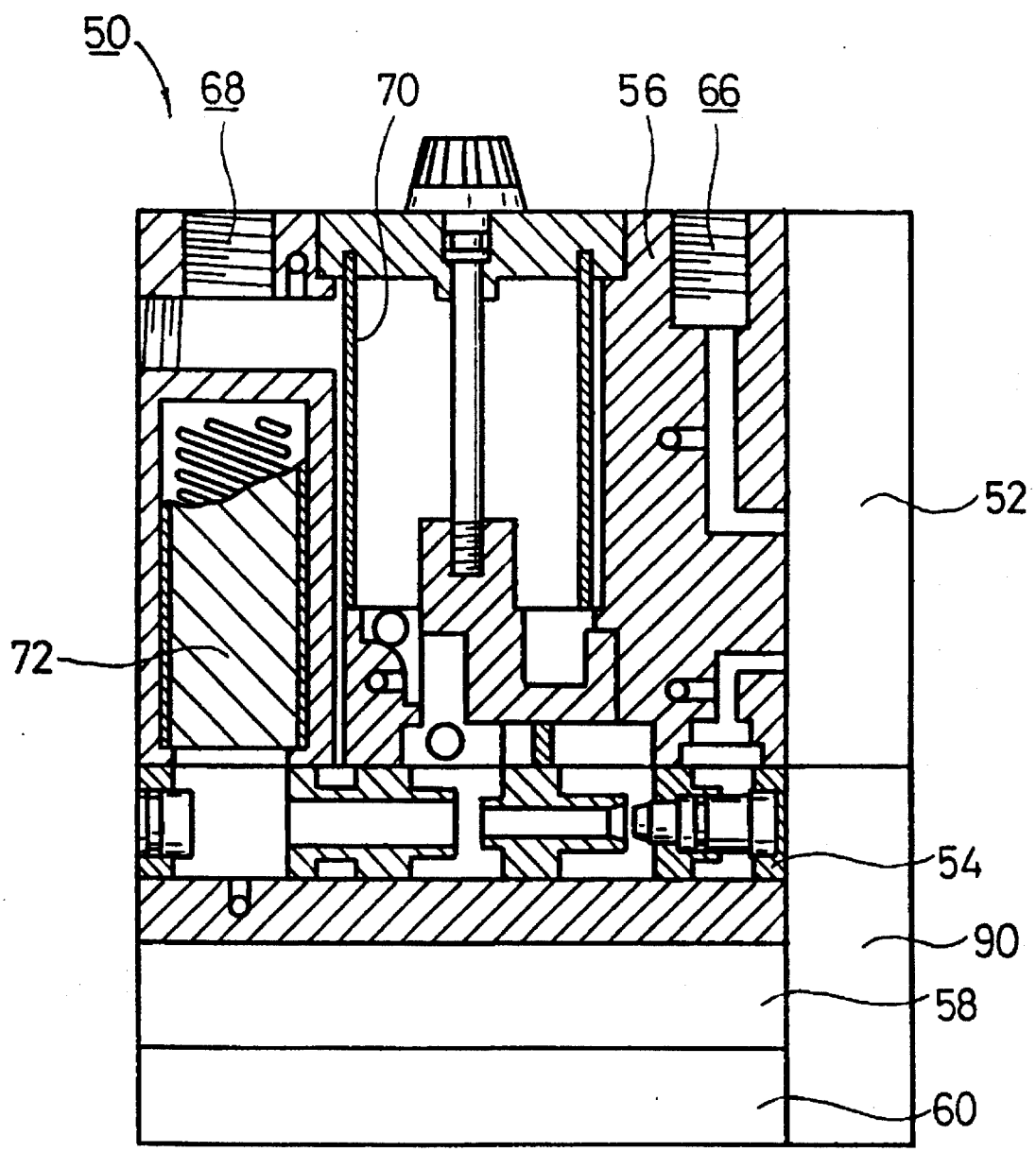
FIG. 2 is a partly cut vertical cross-sectional view illustrating the vacuum unit shown in FIG. 1.
Figure 3:
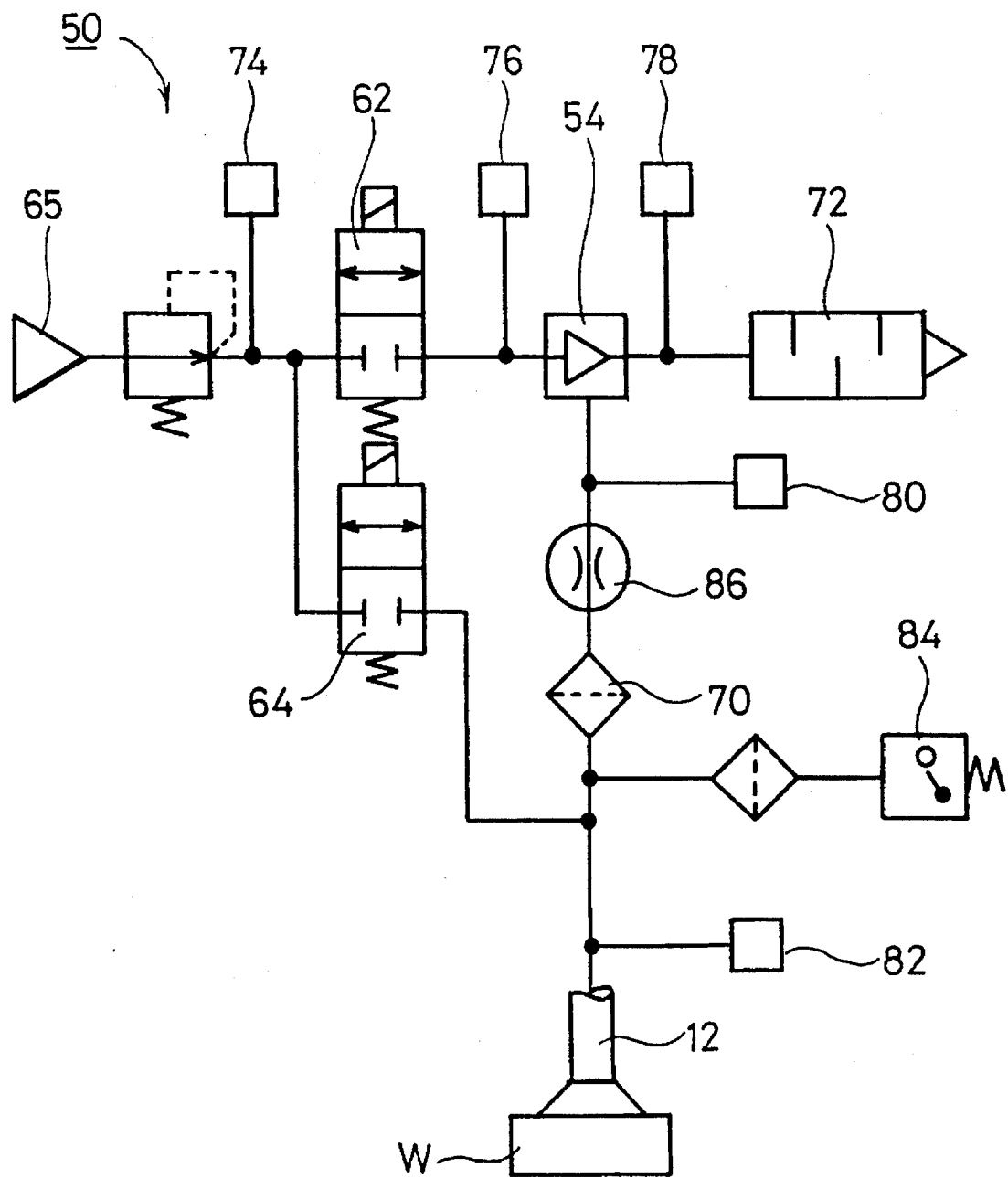
FIG. 3 is a diagram for describing a pneumatic circuit of the vacuum unit shown in FIG. 1.

Referring first to FIG. 2, reference numeral 50 indicates the vacuum unit. The vacuum unit 50 basically comprises a valve block 52, an ejector 54, a filter block 56, a control block 58 and a monitor 60. The blocks 52, 56, 58 and the ejector 54 are integrally formed by either a diecast or a plastic. The valve block 52 has an unillustrated poppet valve disposed therein for feeding compressed air to the ejector 54 and blocking the same, and first and second pilot-operated electromagnetic valves. The first and second pilot-operated electromagnetic valves are of pilot-operated electromagnetic valves used for a compressed-air feed valve 62 and a vacuum break valve 64 respectively, each of which is of a normally-closed type. Each of the first and second pilot-operated electromagnetic valves may be constructed as a normally open type valve or a valve with a detent in order to prevent the work W from falling upon power failure.

The filter block 56 is provided adjacent to the valve block 52. The filter block 56 has an air feed port 66 defined therein, which communicates with a compressed-air feed source 65 and an air inlet port 68 defined therein, which communicates with the work suction cup 12. Further, the filter block 56 has a filter 70 and a silencer 72 both disposed therein and passages defined therein, which are used to cause the ejector 54 and the valve block 52 to communicate with the filter 70 and the silencer 72. There are defined in predetermined positions of the passages, a plurality of holes, and provided thereat pressure sensors 74, 76, 78, 80, 82, a pressure switch 84 and a flowmeter 86 in a connected state, which are constructed so as to have the pressure information processing system 10 shown in FIG. 1 built-in (see FIG. 3). The flowmeter 86 may be a type in which an information processing circuit is incorporated in a known mass flowmeter. Alternatively, the flowmeter 86 may be used as a differential pressure type flowmeter for measuring the flow rate in accordance with the measurement of pressure.

The ejector 54 is disposed adjacent to the filter block 56. The silencer 72 is disposed in the side face of the ejector 54 and serves to silence sound produced by pressurized air fed from the ejector 54.

The control block 58 includes therein the A/D converter 22 for receiving a signal sent from the semiconductor pressure sensor 16 (including a differential pressure type sensor and a capacity type sensor, for example) comprised of a piezo or the like, the controller 30, the $E^2$PROM 32, etc. The control block 58 detects the pressure and the flow rate at each of the positions where the pressure sensors 74, 76, 78, 80, 82, the pressure switch 84 and the flowmeter 86 have been disposed, in accordance with signals supplied from the pressure sensors 74, 76, 78, 80, 82, the pressure switch 84 and the flowmeter 86, and compares the pressure and flow rate thus detected with a preset value so as to produce a failure precognition signal $S_4$. The failure precognition signal $S_4$ enables a failure in, for example, the ejector or the like to be digitally displayed by way of, for example, an English character or other character.

It is needless to say that the valve block 52, the ejector 54 and the filter block 56 are constructed in such a manner that pressurized fluids can flow through internal passages. An electrically-connecting block 90 is disposed between the valve block 52 and both the control block 58 and the monitor 60.

The vacuum unit 50 may be provided in continuation by a manifold. In the vacuum unit 50 as well, a serial transmitting means, a wireless means and a LAN means can be used so as to enable an attendant control signal for the diagnosis of failure and information other than the signals from the valves and the switches to be transmitted or received to and from the external device and other control devices near the vacuum unit 50 and to enable mutual control with respect to the external device and other control devices. These controllers, i.e., the above respective means may be dispersively disposed in a CPU of a sensor. Alternatively, each of them may be disposed in a suitable position in the manifold. These controllers can carry out operations such as timer control for and setting of the valves and switches, etc. in unitary form.

Figure 4:
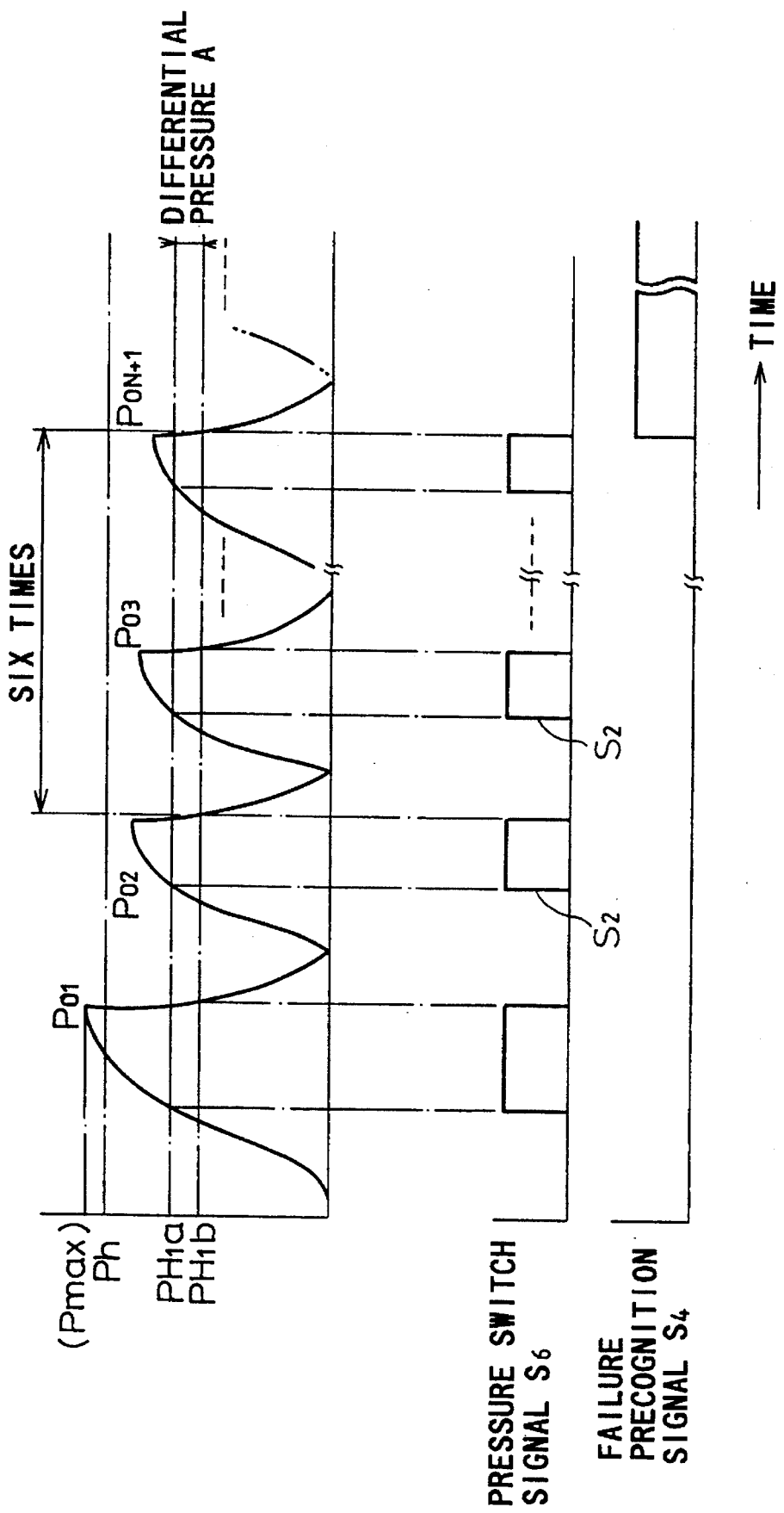
FIG. 4 is a diagram for describing a method of setting threshold values for the pressure information processing system employed in the vacuum unit shown in FIG. 1.

In the vacuum unit 50 constructed as described above, when an operation start instruction signal is first input, compressed air is introduced from the compressed-air feed source 65 through the air feed port 66 so as to produce a vacuum in the ejector 54. The vacuum thus produced brings the work suction cup 12 connected to the air inlet port 68 of the filter block 56 to the negative pressure, i.e., vacuum. Thus, the work suction cup 12 attracts and holds the work W in accordance with the operation of a conveying means such as a robot. Then, the work suction cup 12 is inactivated to release the work W. As a result, the pressure (vacuum) successively applied to the pressure sensor disposed in the vacuum unit 50, e.g., the semiconductor pressure sensor 16 in the pressure sensor 80 for detecting air suction pressure (vacuum pressure) of the ejector 54, is represented in the form of pressure values sequentially varied as illustrated in FIG. 4, i.e., $P_{O1}$, $P_{O2}$, $P_{O3}$, . . . , $P_{ON+1}$. As is easily understood from the drawing at this time, there is often a situation in which the highest vacuum pressure value (degree of vacuum) is reduced with the elapse of time owing to leakage of the vacuum pressure from the work suction cup 12 side and clogging of the filter, for example. A signal corresponding to each of the pressure changes or values $P_{O1}$, $P_{O2}$, $P_{O3}$, . . . , $P_{ON+1}$ is supplied via the semiconductor pressure sensor 16 and the amplifier 20 to the A/D converter 22 where it is converted into a digital detection signal $S_2$, which is, in turn, input to the controller 30.

In the controller 30, the maximum value ($P_{max}$) of the pressure change $P_{O1}$ first specifies a first address of the $E^2$PROM 32 and is stored thereat.

Then, the switch $S_{W3}$ is turned ON to compute threshold values $PH_{1a}$, $PH_{1b}$ for providing a differential pressure A therebetween, which are stored in the $E^2$PROM 32. At this case, a second address of the $E^2$PROM 32 is specified and 70% (threshold value $PH_{1a}$) of the maximum value ($P_{max}$) is computed and stored at the specified second address. Then, a third address of the $E^2$PROM 32 is specified and 65% (threshold value $PH_{1b}$) of the maximum value ($P_{max}$) is computed and stored at the specified third address.

Now, a pressure switch signal $S_6$, which appears depending on the pressure changes $P_{O1}$ through $P_{ON+1}$ is continuously produced in association with the threshold values $PH_{1a}$, $PH_{1b}$. The pressure switch signal $S_6$ is used for full-closed control of various control driving means such as a delivering device and for information processing in an FMS, a CIM, etc. Further, an assembling machine and a processing machine or the like can be brought to a high level.

Then, a fourth address of the $E^2$PROM 32 is specified and 80% (threshold value Ph) of the maximum value ($P_{max}$) is computed and stored at the specified fourth address.

The threshold value Ph represents a point reduced by 20% of the normal highest vacuum pressure value, i.e., the maximum value ($P_{max}$, the maximum degree of vacuum) of the pressure change $P_{O1}$. Pressure values below the threshold value Ph are regarded as being unwanted or improper pressure states.

Then, the improper pressure values or changes below the threshold value Ph corresponding to the failure precognition determining vacuum, i.e., the pressure changes $P_{O2}$ through $P_{ON+1}$ (each corresponding to the digital detection signal $S_2$ as a signal, for example) of the pressure changes $P_{O1}$ through $P_{ON+1}$ are cumulatively stored six times. When the improper pressure values thus stored have coincided with improper set values counted six times, which have been previously set by the switches $S_{W1}$, $S_{W2}$ and $S_{W3}$, the failure precognition signal $S_4$ is continuously produced.

A process for producing the failure precognition signal $S_4$, for example, is carried out by executing the program of the controller 30. In addition, information on such a process is stored in the $E^2$PROM 32. When the controller 30 is activated again after the power source has been turned off, the failure precognition signal $S_4$ is produced based on the operation state of the controller 30, thereby making it possible to read the information again from the $E^2$PROM 32.

As described above, the pressure information processing system 10 automatically and accurately sets the threshold values $PH_{1a}$, $PH_{1b}$ and Ph with respect to the maximum value ($P_{max}$) of the pressure change $P_{O1}$ and hence self-diagnoses whether or not a failure in the operation of the vacuum unit 50 has occurred.

Incidentally, 70%, 65% and 80%, which are of the threshold values of $PH_{1a}$, $PH_{1b}$ and Ph, can be changed. These changed values are cleared by turning ON the reset switch $S_{W4}$. Afterwards, the up/down switches $S_{W1}$, $S_{W2}$ may be turned ON to set these values using the switch $S_{W3}$ after a change in the numerical value based on a 5% step has been made, for example.

Incidentally, in the above-described embodiment, the threshold values $PH_{1a}$, $PH_{1b}$ and the threshold value Ph are digitally set with respect to the maximum value ($P_{max}$) of the pressure change $P_{O1}$. However, as an alternative, a pressure curve indicative of the pressure change $P_{O1}$ is stored as data and the threshold values $PH_{1a}$, $PH_{1b}$ and Ph can also be set in the same manner as described above.

Figure 5:
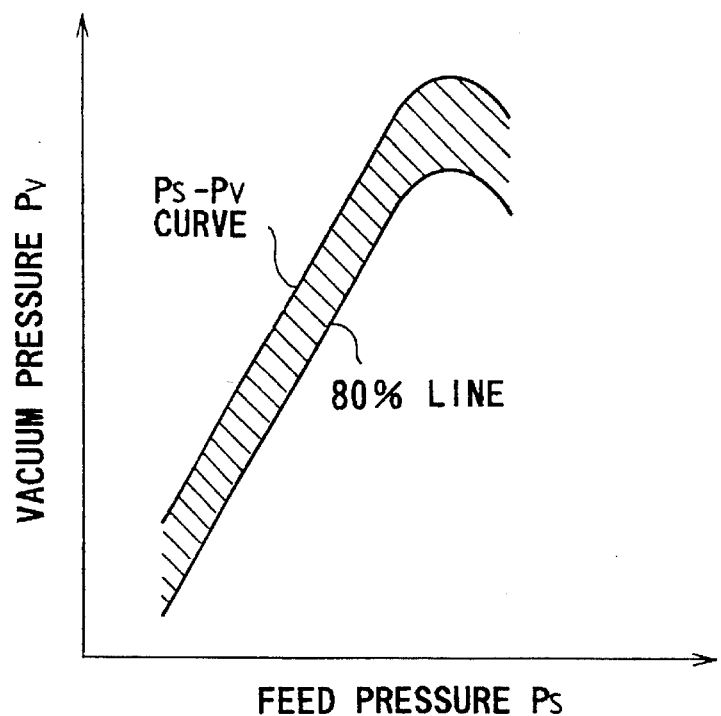
FIG. 5 is a diagram for describing a method of setting threshold values for the pressure information processing system employed in the vacuum unit shown in FIG. 1.

On the other hand, the above threshold values can also be set in the following manner. First of all, the work W is attracted in advance. At this time, the pressure sensors 76, 80 detect pressure $P_S$ for feeding the compressed air to the ejector 54 and vacuum pressure $P_V$ generated from the ejector 54, respectively. A curve (80% line in FIG. 5) in which the value of the vacuum pressure $P_V$ is 80%, is set with respect to a $P_S$–$P_V$ curve obtained from the pressure $P_S$ and the vacuum pressure $P_V$. After such a curve setting has been completed, the vacuum unit 50 is actually operated to cause the pressure sensors 76, 80 to detect the feed pressure $P_S$ and the vacuum pressure $P_V$ respectively. When the detected feed pressure $P_S$ and vacuum pressure $P_V$ do not fall within a range (indicated by oblique lines in FIG. 5) between the $P_S$–$P_V$ curve and the 80% line, the failure precognition signal $S_4$ is produced from the controller 30.

Figure 6:
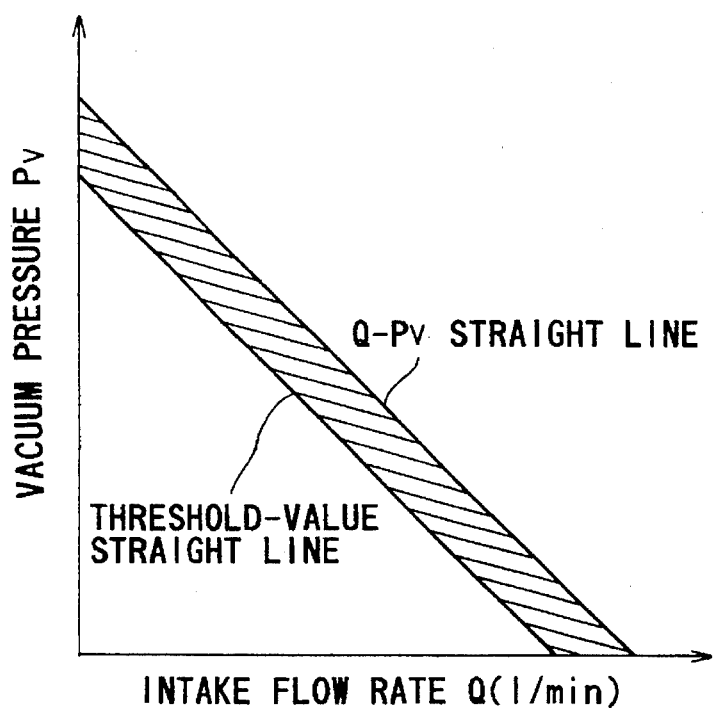
FIG. 6 is a diagram for describing a method of setting threshold values for the pressure information processing system employed in the vacuum unit shown in FIG. 1.

Furthermore, the threshold values may also be set in the following manner. First of all, the pressure sensor 80 and the flowmeter 86 detect in advance vacuum pressure $P_V$ produced from the ejector 54, which corresponds to the pressure $P_S$ for feeding given air to the ejector 54, and an inlet or suction flow rate Q of the ejector 54, respectively. Then, a threshold-value straight line is set with respect to a Q–$P_V$ straight line determined from the detected vacuum pressure $P_V$ and the suction flow rate Q as shown in FIG. 6. When the vacuum pressure $P_V$ and the suction flow rate Q do not fall within a range indicated by oblique lines, the failure precognition signal $S_4$ is produced.

Thus, when it is recognized that the vacuum unit 50 fails to operate in the normal manner, the controller 30 is activated to cause the pressure sensors 74, 76, 78, 80, 82 to detect pressure values respectively and to calculate the differences in pressure between the respective pressure values thus detected. It is thus possible to specify any one which causes a failure in operation from the air feed valve 62, the vacuum break valve 64, the ejector 54, the silencer 72, the filter 70 and the work suction cup 12 depending on variations in both the pressure values and the differential pressure. For example, when the difference between the pressure detected by the pressure sensor 80 disposed on the upstream side and the pressure detected by the pressure sensor 82 disposed on the downstream side, i.e., the differential pressure exceeds a predetermined threshold value, a "failure in the filter" signal is displayed on the monitor 60 by using the LCD 38.

Thus, the controller 30 can automatically recognize a failure in the operation of the vacuum unit 50 because the pressure sensors 74, 76, 78, 80, 82 and the flowmeter 86 are placed in suitable positions in the vacuum unit 50. At the same time, the pressure sensors 74, 76, 78, 80, 82 can specify failure points or positions of the air feed valve 62, the ejector 54, the filter 70, etc.

Other embodiments showing vacuum pressure information processing systems of the present invention will hereinafter be described with reference to FIGS. 7 through 12.

Figure 7:
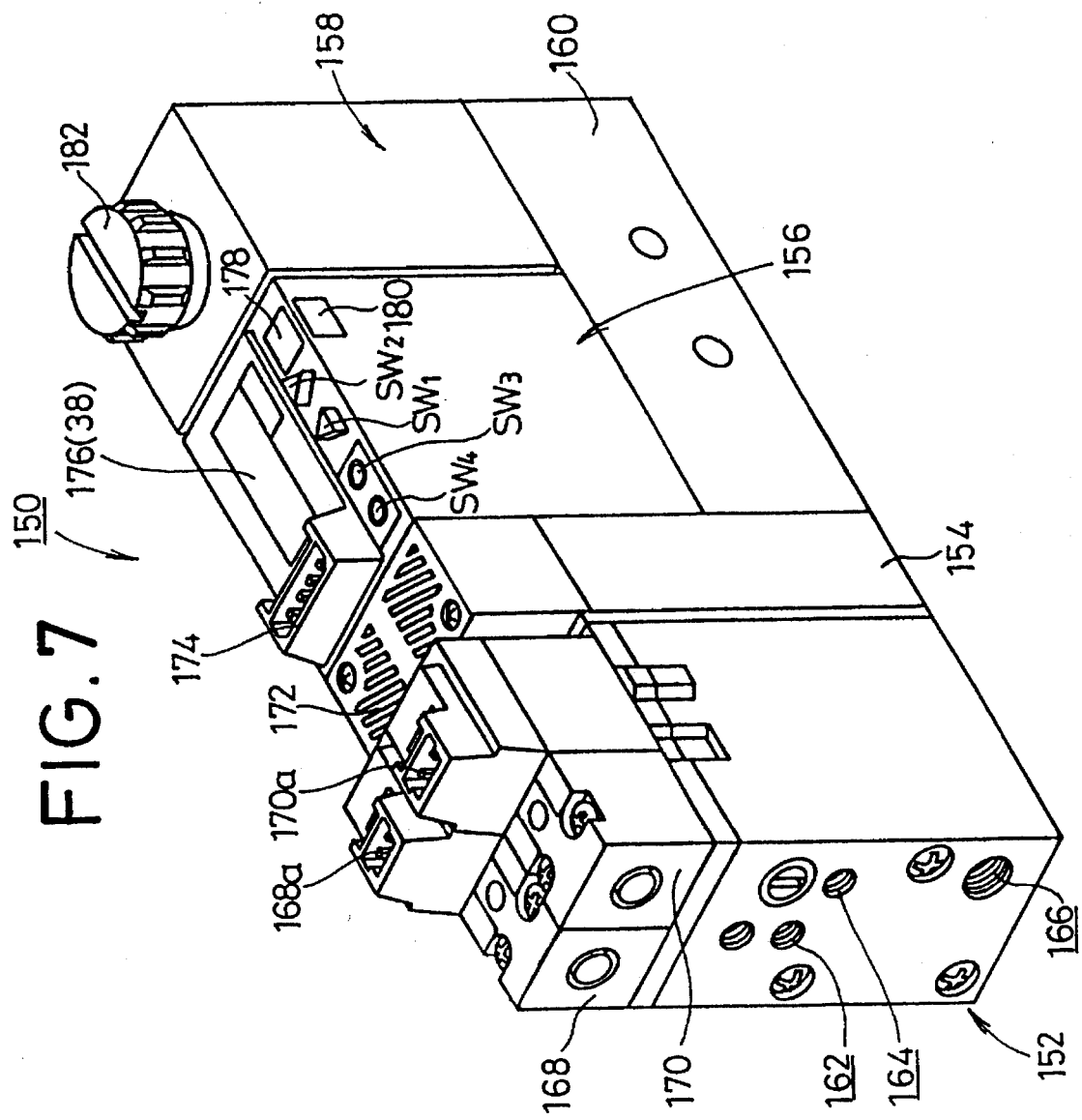
FIG. 7 is a perspective view showing another embodiment of a vacuum unit according to the present invention.
Figure 8:
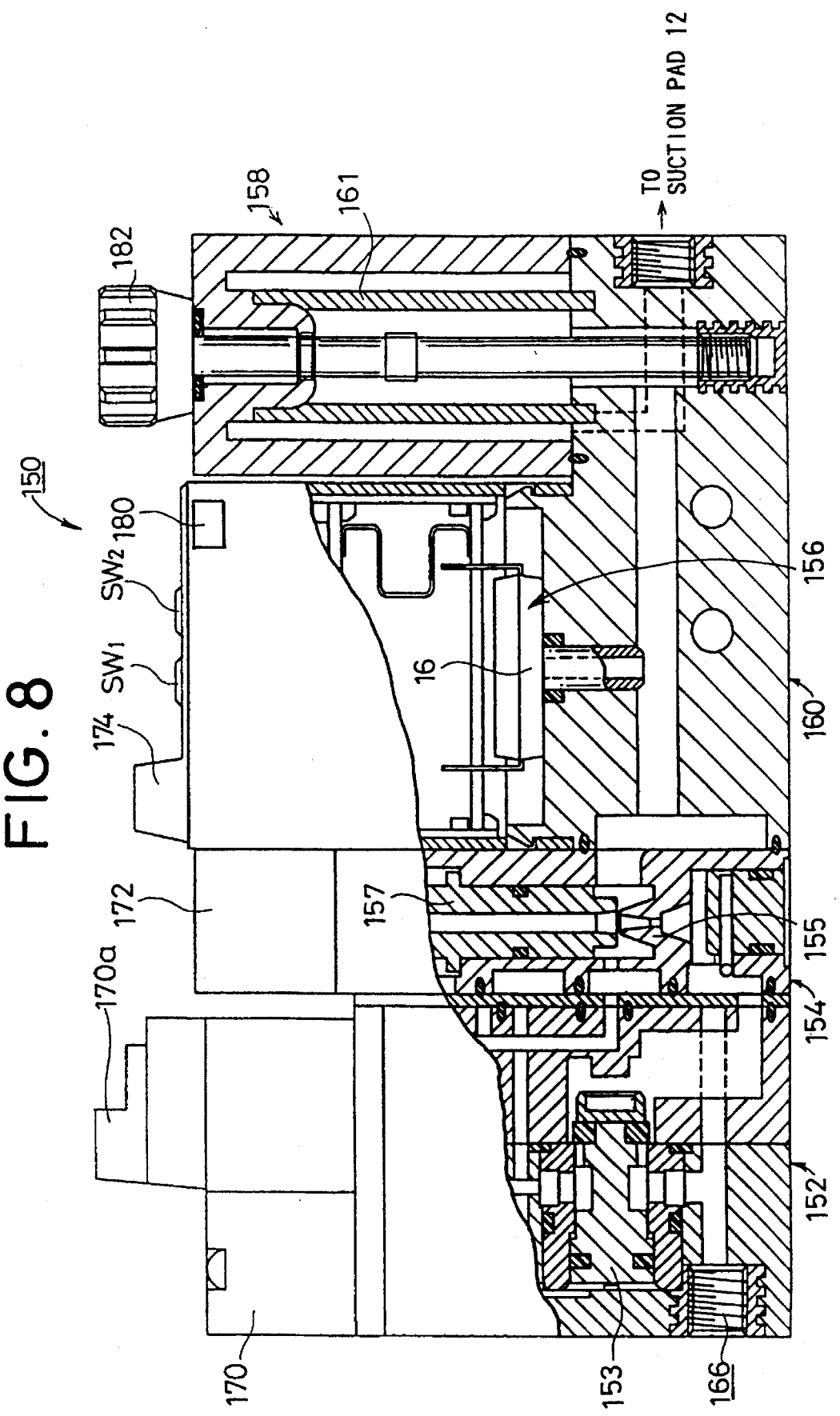
FIG. 8 is a vertical cross-sectional view, partly in cross section, illustrating the structure of a vacuum unit according to the present invention in which an ejector has been incorporated.

Referring now to FIGS. 7 and 8, reference numeral 150 indicates a vacuum control apparatus. The vacuum control apparatus 150 basically comprises a valve block 152, an ejector 154, a detecting unit 156, a filter 158 and a connecting member 160. The valve block 152 has air inlet ports 162, 164, 166 defined therein, a poppet valve 153 disposed therein for feeding compressed air to the ejector 154 and blocking the same, and first and second electromagnetic valves 168, 170 mounted on the upper surface thereof. The first electromagnetic valve 168 is used as a compressed-air feed valve, whereas the second electromagnetic valve 170 is used as an electromagnetic valve for the vacuum break. In order to supply electric power and a control signal such as an ON/OFF signal to the outside via unillustrated conductors, the first and second electromagnetic valves 168 and 170 are provided with first and second connectors 168a, 170a respectively. The ejector 154 is provided adjacent to the valve block 152. In addition, the ejector 154 has a nozzle 155 and a diffuser 157 both disposed therein and a silencer 172 mounted on the upper surface thereof. The silencer 172 serves to silence sound generated by pressurized air produced from the diffuser 157 of the ejector 154. The detecting unit 156 detects pressure under vacuum and includes the semiconductor pressure sensor 16 disposed therein. The detecting unit 156 also includes, on the upper surface thereof, a connector 174, a digital display unit 176, a set-value up switch $S_{W1}$, a set-value down switch $S_{W2}$, a set switch $S_{W3}$, a reset switch $S_{W4}$, and display units 178, 180. The digital display unit 176 can carry out visual representation of "failure" or "break down", etc. in either English or other language, for example. The filter 158 has a main body 161 disposed therein, which includes a hydrophobic material and serves to prevent water or moisture from entering therein. In addition, the filter 158 is detachably mounted on the connecting member 160 by a control 182. It is needless to say that each of the valve block 152, the ejector 154, the silencer 172, the detecting unit 156 and the filter 158 is in a communication state in such a manner that pressurized fluids can flow through each of internal passages. In particular, there are disposed in the detecting unit 156, the semiconductor pressure sensor 16 (including a differential pressure type sensor or a capacity type sensor, for example) comprised of a piezo or the like, the constant-current circuit 18, the amplifier 20, the A/D converter 22, the controller 30, the EE($E^2$)PROM 32, the LCD driver 34, etc. as already described in FIG. 1. The connector 174 can be electrically-connected with conductors to produce the failure precognition signal $S_4$ and the pressure switch signal $S_6$ shown in FIG. 1. The connector 174 can also be connected with a power source relative to the detecting unit 156, and a control signal line or conductor. In addition, the connector 174 can provide a communication function for another vacuum control apparatus, an external control apparatus, etc. so as to supply pressure detection information or control information therefrom.

Figure 10:
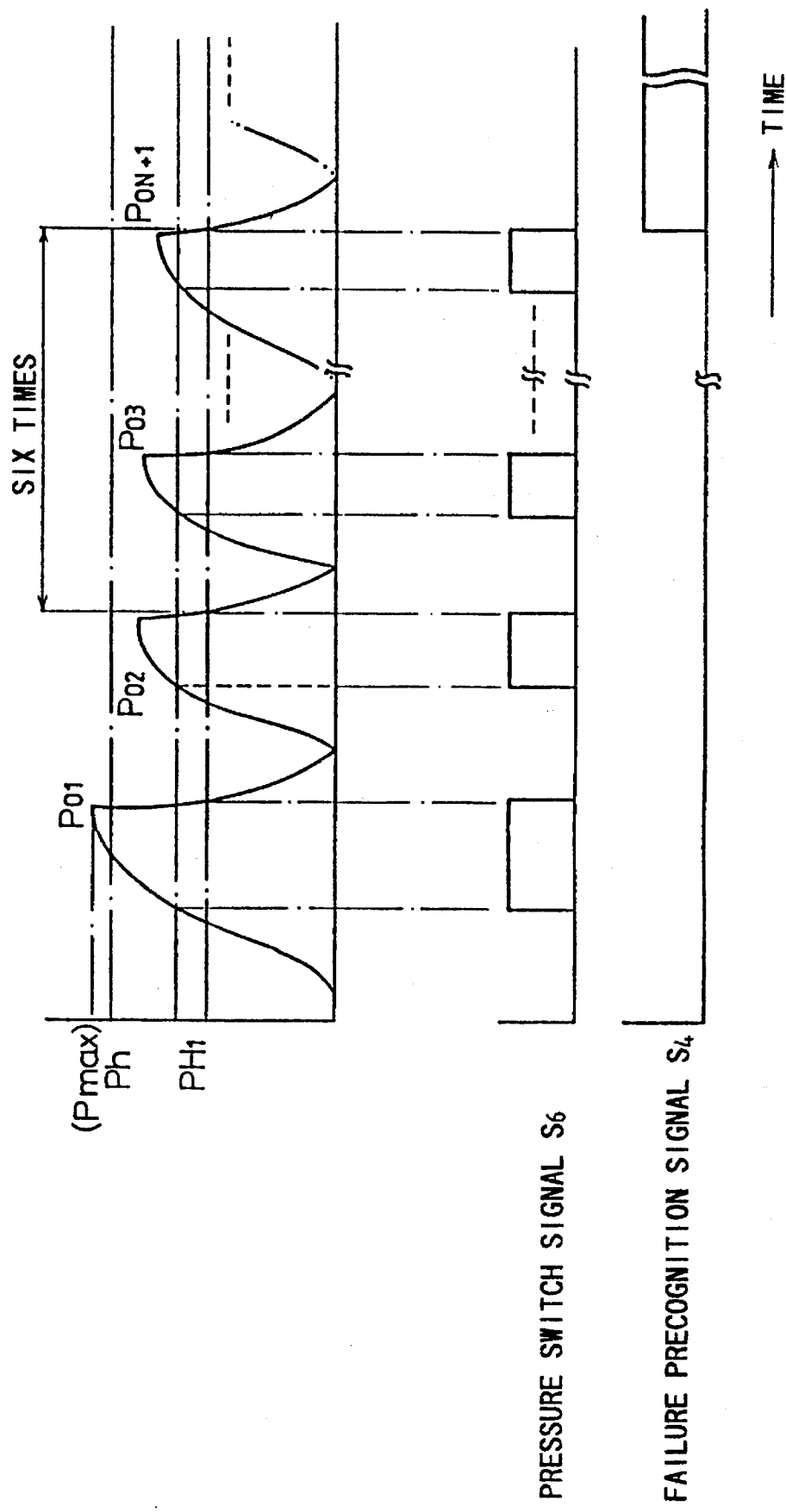
FIG. 10 is a diagram for describing the operation of each of the embodiments shown in FIGS. 7 through 9.

In the vacuum control apparatus constructed as described above, when an operation start instruction signal is first input, pressurized air is introduced from the air inlet port 166 so as to produce a vacuum in the ejector 154. At this case, the air feed ports 162, 164 have been sealed with blank caps respectively. The so-produced vacuum brings the work suction cup 12 coupled to an unillustrated port of the connecting member 160 to the negative pressure, i.e., vacuum. Thus, the work suction cup 12 attracts and holds the work W in accordance with the operation of a conveying means such as a robot. Then, the work suction cup 12 is inactivated to release the work W. As a result, the pressure (vacuum) successively applied to the semiconductor pressure sensor 16 in the detecting unit 156 is represented in the form of pressure values sequentially varied as illustrated in FIG. 10, i.e., $P_{O1}$, $P_{O2}$, $P_{O3}$, . . . , $P_{ON+1}$. As is easily understood from the drawing at this time, there is often a case in which the highest vacuum pressure value (degree of vacuum) is reduced with the elapse of time owing to leakage of the vacuum pressure from the work suction cup 12 side and clogging of the filter 158, for example.

A signal corresponding to each of the pressure values $P_{O1}$, $P_{O2}$, $P_{O3}$, . . . , $P_{ON+1}$ is supplied via the semiconductor pressure sensor 16 and the amplifier 20 to the A/D converter 22 where it is converted into a digital detection signal $S_2$, which is, in turn, input to the controller 30.

The controller 30 has a program stored therein, which will be described later. Firstly, peak-held values of the pressure values $P_{O1}$, $P_{O2}$, $P_{O3}$, . . . , $P_{ON+1}$ under a predetermined mode specify a first address of the $EE(E^2)PROM$ 32 and are stored thereat. The values referred to above are successively displayed on the LCD 38 of the digital display unit 176 together with the previous respective values. Then, the mode is shifted from the predetermined mode to a second mode and the threshold value for producing the pressure switch signal $S_6$ relative to each of the pressure values $P_{O1}$, $P_{O2}$, $P_{O3}$, ..., $P_{ON+1}$, i.e., a so-called differential pressure $PH_1$, is set by the switches $S_{W1}$ through $S_{W4}$ under this second mode. Thereafter, the second mode is further changed to a third mode so as to set a failure precognition determining vacuum Ph which defines a point reduced by, for example, 20% of the normal highest vacuum pressure value (maximum degree of vacuum) as a pressure value for making a failure precognition judgment. Then, the vacuum thus set specifies a third address and is stored thereat in the $EE(E^2)PROM$ 32. An arithmetical operation on the differential pressure $PH_1$ is performed and the result of its operation may be stored in the $EE(E^2)PROM$ 32 as a value reduced by several percent to several tens percent from the maximum value ($P_{max}$) of the pressure change $P_{O1}$.

Further, unwanted or improper pressure values below the failure precognition determining vacuum Ph among the pressure values $P_{O1}$, $P_{O2}$, $P_{O3}$, ..., $P_{ON+1}$ are set up (counted for setting) six times, for example. Such set values or the like are visually displayed on the LCD 38.

After the above pressure-value setting process has been completed, the pressure switch signal $S_6$ corresponding to the differential pressure $PH_1$ with respect to each of the pressure values $P_{O1}$, $P_{O2}$, $P_{O3}$, ..., $P_{ON+1}$ or information about the differential pressure $P_{H1}$ is continuously produced in such a manner as to be used for full-closed control of each of various control driving means such as a delivering means and for information processing in an FMS, a CIM, etc.

On the other hand, unwanted or improper vacuum-value data Pd (corresponding to the digital detection signal $S_2$ as a signal, for example) below the Ph among the pressure values $P_{O1}$, $P_{O2}$, $P_{O3}$, ..., $P_{ON+1}$ is continuously produced six times. That is, when the count of the improper vacuum-value data Pd is performed six times, the failure precognition signal $S_4$ is continuously produced.

At this time, information about the production of the failure precognition signal $S_4$ or the like is stored in the $EE(E^2)PROM$ 32 and the information can be read again from the $EE(E^2)PROM$ 32 when the controller 30 is activated again after the power source has been turned off.

The sequential control of the controller 30 for producing the failure precognition signal $S_4$ based on the program stored in the ROM 30b will now be described below.

Figure 11:
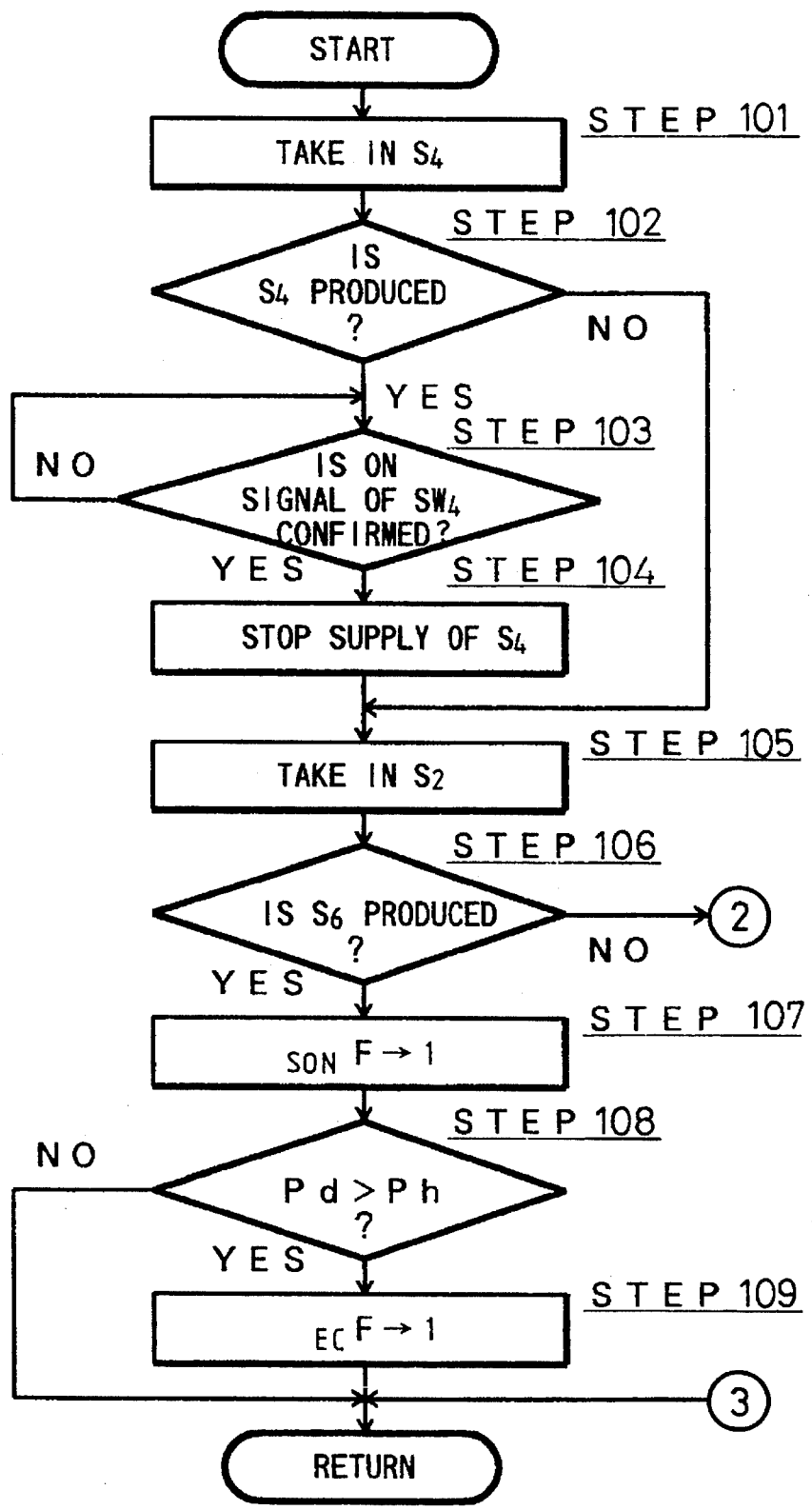
FIG. 11 is a flowchart for describing a program executed by a controller employed in each of the embodiments shown in FIGS. 7 through 9.
Figure 12:
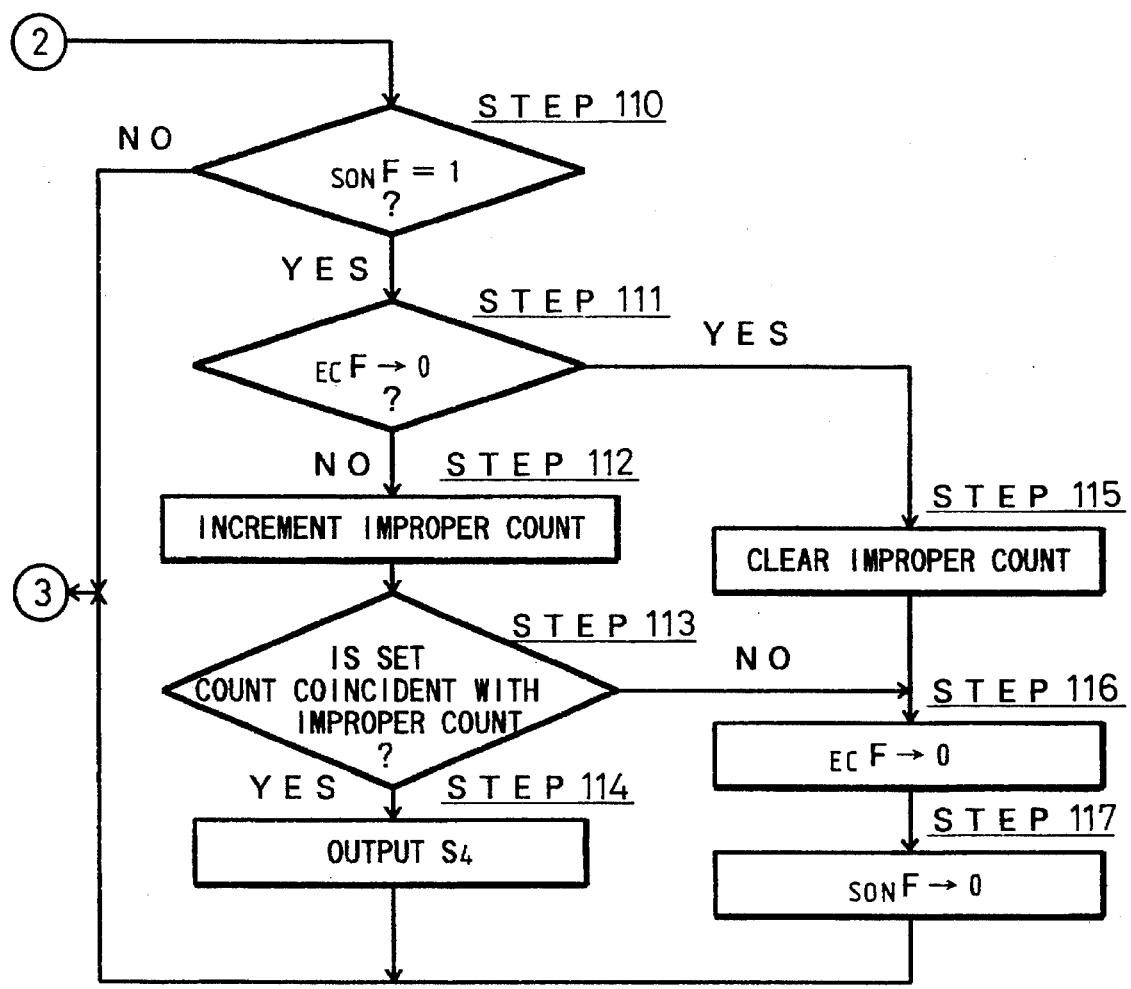
FIG. 12 is a flowchart for describing another program executed by the controller employed in each of the embodiments shown in FIGS. 7 through 9.

The present program is executed in such a manner that the controller 30 starts its operation in response to the input of the operation start instruction signal for the entire apparatus to the controller 30 (see FIGS. 11 and 12).

1) A process for taking in the failure precognition signal $S_4$ is executed in Step 101 (see FIGS. 11 and 12).
2) A process for determining whether or not the failure precognition signal $S_4$ has been produced is executed in Step 102. If the answer is determined to be YES, then the routine procedure proceeds to Step 103. If the answer is determined to be NO, then the routine procedure proceeds to Step 105.
3) A process for determining whether or not an ON signal has been produced when the switch $S_{W4}$ is turned on is executed in Step 103. If the answer is determined to be NO, then the routine procedure is returned to Step 103. If the answer is determined to be YES, then the routine procedure proceeds to the next Step 104.
4) A process for stopping the delivery of the failure precognition signal $S_4$ from the controller 30 is executed in Step 104.

A process for stopping the delivery of the failure precognition signal $S_4$ continuously produced till now in Steps 101 through 104 from the controller 30 is executed.
5) A process for allowing the controller 30 to take in the digital detection signal $S_2$ is executed in Step 105.
6) A process for determining whether or not the pressure switch signal $S_6$ has been produced is executed in Step 106. If the answer is determined to be YES, then the routine procedure proceeds to the next Step 107. If the answer is determined to be NO, then the routine procedure proceeds to Step 110.
7) A process for bringing a flag $_{SON}F$ to 1 when the pressure switch signal $S_6$ is in an ON state, is executed in Step 107. If the pressure switch signal $S_6$ is in an OFF state, then the flag $_{SON}F$ is brought to 0, and hence the flag $_{SON}F$ is down (reset).
8) A process for determining whether or not the vacuum-value data Pd (the highest vacuum pressure value of the digital detection signal $S_2$) is greater than the failure precognition determining vacuum Ph (i.e., Pd>Ph) is executed in Step 108. If the answer is determined to be NO, it is then determined that the vacuum-value data Pd is normal, and hence the routine procedure proceeds to "RETURN". If the answer is determined to be YES, then the routine procedure proceeds to the next Step 109.
9) A process for bringing a flag $_{ED}F$ to 1 when the vacuum-value data Pd exceeds the failure precognition determining vacuum Ph at the time that the pressure switch signal $S_6$ is in the ON state, is executed in Step 109. Thereafter, the routine procedure proceeds to "RETURN".
10) If the answer is determined to be NO in Step 106, then a process for determining whether or not the flag $_{SON}F$ has been brought to 1 is executed in Step 110. If the answer is determined to be NO, then the routine procedure proceeds to "RETURN". If the answer is determined to be YES, then the routine procedure proceeds to the next Step 111.
11) A process for determining whether or not the flag $_{ED}F$ has been brought to 1 is executed in Step 111. If the answer is determined to be YES, then the routine procedure proceeds to Step 115. If the answer is determined to be NO, then the routine procedure proceeds to the next Step 112.
12) A process for performing an increment in the unwanted or improper count (six times) is executed in Step 112.
13) A process for comparing each of values obtained by performing the increment in the improper count (six times) with each of set counts (six times) so as to determine based on the result of comparison whether or not they coincide with each other, is executed in Step 113. If the answer is determined to be YES, then the routine procedure proceeds to the next Step 114. If the answer is determined to be NO, then the routine procedure proceeds to Step 116.
14) A process for delivering the failure precognition signal $S_4$ from the controller provided that each incremented value (six times) in Step 113 is regarded as each set count (six times), is executed in Step 114. Thereafter, the routine procedure proceeds to "RETURN" to start the next determining process.
15) If the answer is determined to be YES in Step 106, i.e., if the vacuum-value data Pd exceeds the failure precognition determining vacuum Ph in the ON state of the pressure switch signal $S_6$, then a process for bringing its undesired result to a normal state so as to clear the unwanted or improper count is executed in Step 115.

16) A process for bringing the flag $_{ED}F$ to 0 is executed in Step 116, followed by proceeding to the next Step 117.

17) A process for bringing the flag $_{SON}F$ to 0 is executed in Step 117. Thereafter, the routine procedure proceeds to "RETURN" to start the next determining process again.

Thus, when the improper count with respect to the failure precognition determining vacuum Ph coincides with the preset number of times, i.e., the preset count at the time that the highest vacuum pressure value is lowered with the elapse of time by repeatedly performing a process for delivering the work W, for example, the failure precognition signal $S_4$ is produced so as to previously provide effective information about the time when devices such as the filter, the ejector, etc. should be replaced by new ones due to the clogging of the filter 158, the deterioration in performance of the ejector, etc. In addition to the supply of such effective information, the pressure values such as the failure precognition determining vacuum Ph, the differential pressure $PH_1$, etc. can be accurately and easily set up and distinctly displayed together with the present pressure value.

In the illustrated embodiment, the number of times n (unwanted or improper count) in which the vacuum-value data cannot reach the failure precognition determining vacuum Ph and the preset number of times N (set count) are six times in succession. In addition, the failure precognition signal $S_4$ is produced, that is, the failure precognition signal $S_4$ indicative of the pressure value disabling the normal work delivering process or the like is produced to provide information about a pre-judgment.

A criterion for such a previous judgment can be changed depending on the construction and the operational state of the delivering means. Thus, such a criterion is applied to, for example, a case in which a more effective and experimental value, e.g., vacuum-value data Pd produced one time cannot reach the failure precognition determining vacuum Ph, a case in which the rate at which the vacuum-value data Pd cannot reach the failure precognition determining vacuum Ph within a predetermined number of times, exceeds a predetermined value, and a case in which the rate at which the vacuum-value data Pd cannot reach the failure precognition determining vacuum Ph during a predetermined period of time, exceeds a given value. In this case, a program based on the above criterion may be executed so as to produce the failure precognition signal $S_4$ in a manner similar to the aforementioned embodiment.

Figure 9:
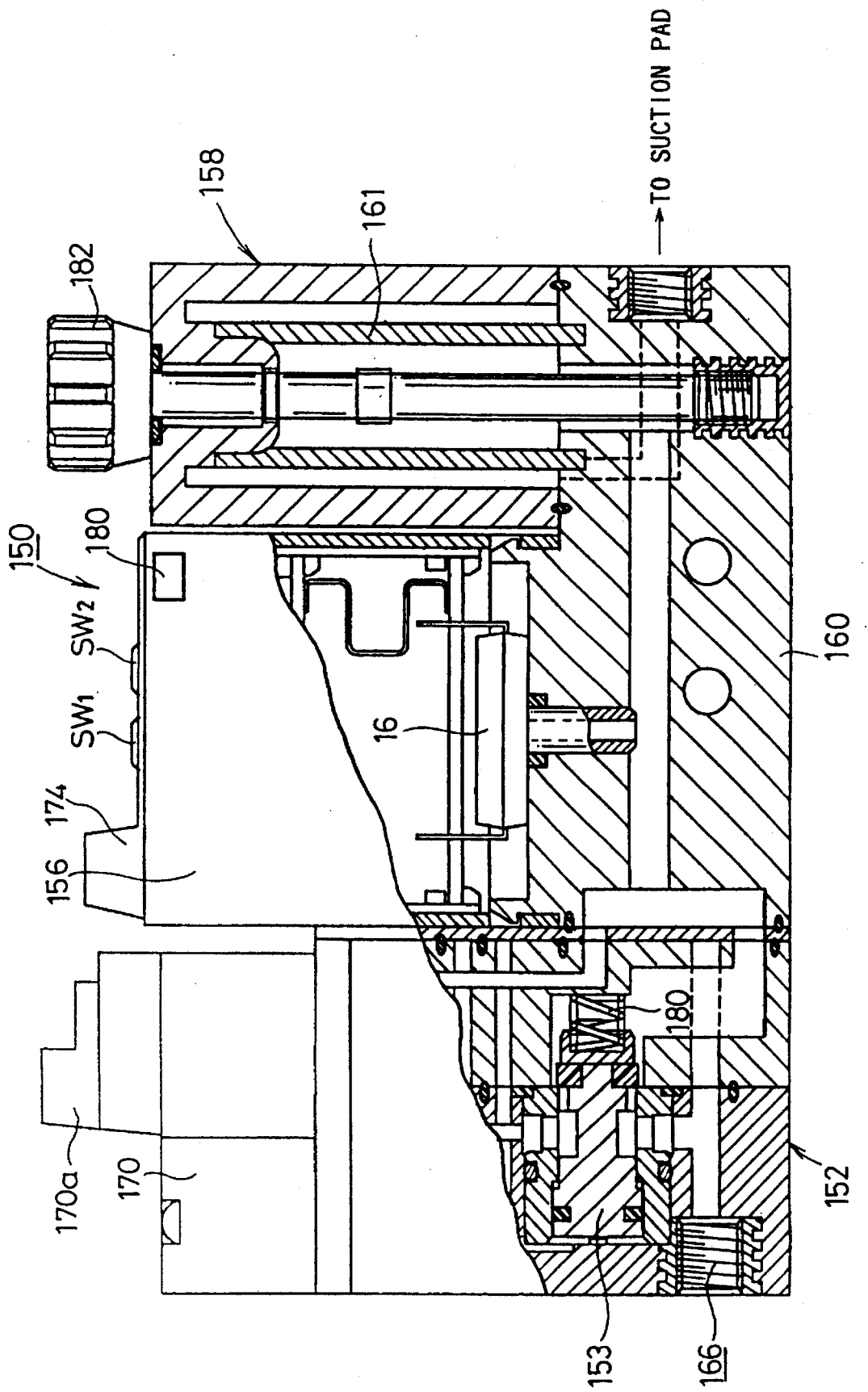
FIG. 9 is a vertical cross-sectional view, partly in cross section, showing the structure of a vacuum unit according to the present invention to which a vacuum pump is coupled.

FIG. 9 shows an embodiment different from the embodiment illustrative of the vacuum control apparatus 150 of FIG. 8 in which the ejector has been incorporated. This embodiment is constructed such that a vacuum pump (not shown) as an alternative to the ejector 154 is coupled to a port 166. Therefore, a poppet valve 153 has substantially the same shape as that of the poppet valve shown in FIG. 8. However, the poppet valve 153 is reset by a coil spring 180. The remaining construction of the present embodiment is identical to that of the vacuum control apparatus 150 shown in FIG. 8, and its detailed description will therefore be omitted. Incidentally, operations and effects of the vacuum control apparatus 150 shown in FIG. 9 are substantially identical to those of the vacuum control apparatus shown in FIG. 8.

Further, the vacuum control apparatuses shown in FIGS. 8 and 9 can also be plurally provided in continuation with one another and manifolded. The vacuum control apparatus may be set up so as to have the arrangement shown in FIG. 5, which is disclosed in Japanese Patent Application Laid-Open Publication No. 63-154900, for example. Moreover, valves and sensor control portions (reference numerals 168a, 170a, 174 in the present embodiment) may be integrally formed to carry out processes such as control for electromagnetic valves, confirmation for the attraction of a work, precognition of a failure and ON/OFF control of each valve. In the above-described embodiment, the threshold values are set up in digital form with respect to the maximum value of the pressure values which vary with time. However, as an alternative to the above method, there is a method wherein information about curves indicative of changes in pressure is stored and various threshold values can be set based on the curve information.

The vacuum unit according to the present invention can bring about the following advantages.

Internal pressures of the vacuum unit are detected by a pressure sensor disposed on either one of the upstream stream and downstream sides of at least one of components provided inside the vacuum unit. In addition, threshold values relative to the internal pressures are set by a setting means and a detected pressure value is compared with each of these threshold values, thereby confirming a failure in the operation of the vacuum unit. Further, a failure such as clogging of a filter can be confirmed from variations in pressure of the individual components and hence failure or faulty points can be specified. It is therefore possible to quickly repair the faulty points or parts in the vacuum unit or replace same with new ones.

Having now fully described the invention, it will be apparent to those skilled in the art that many changes and modifications can be made without departing from the spirit or scope of the invention as set forth herein.

What is claimed is:

1. A method of electrically processing vacuum pressure information, which is suitable for use in a vacuum unit in which a workpiece is attracted or released under suction, said method being executed by a vacuum control apparatus and comprising the steps of:

providing a plurality of pressure sensors disposed at different positions in the vacuum unit;

detecting pressure values at said different positions in the vacuum unit upon attraction and release of the workpiece;

displaying a desired pressure value on a displaying means in digital form, said desired pressure value being lower than a highest vacuum pressure value of a plurality of sequential pressure values detected by at least one of said pressure sensors;

storing said desired pressure value in a storing means;

converting each of said sequential pressure values into digital signals, said sequential pressure values being detected by a pressure detecting element held in front of a passage which communicates with a vacuum port, and thereafter digitally displaying the converted digital signals on said displaying means;

comparing said desired pressure value stored in said storing means with each of said sequential pressure values;

determining improper operation of said vacuum unit based on a result of the comparison of said desired pressure value stored in said storing means with each of said sequential pressure values; and after the improper operation of said vacuum unit has been determined at said determining improper operation step, said method comprises the step of:

determining a failure point in said vacuum unit which includes the steps of:

(a) detecting a further pressure value at a position upstream from a component in said vacuum unit through one of said plurality of pressure sensors located at said position upstream from said component in the vacuum unit;

(b) detecting a further pressure value at a position downstream from said component through a further one of said plurality of pressure sensors located at said position downstream from said component;

(c) determining a differential pressure between the detected further pressure values upstream and downstream from said component; and (d) comparing said differential pressure with a predetermined threshold value; and displaying information about said failure point on said displaying means based on a result of said comparison of said differential pressure with said predetermined threshold value.

2. A method according to claim 1, wherein said desired pressure value stored in said storing means comprises a first pressure value lower than the highest vacuum pressure value, which has been determined from said sequential pressure values and a second pressure value lower than said first pressure value, and a predetermined pressure width for avoiding a chattering action is specified by said first and second pressure values.

3. A method according to claim 2, wherein when each of said sequential pressure values is lower than said desired pressure value for a plural number of times in succession upon said comparison of said desired pressure value stored in said storing means with each of said sequential pressure values, an improper operation signal is produced as a predetermined signal.

4. A system for electrically processing vacuum pressure information, which is suitable for use in a vacuum unit in which a workpiece is attracted or released under suction, said vacuum unit being activated to cause components of the vacuum unit to communicate with one another through a predetermined passage, said system comprising:

a plurality of pressure sensors disposed at different positions in the vacuum unit;

means for attracting a workpiece under suction, said pressure sensors detecting sequential pressure values occurring in said vacuum unit upon attraction and release of said workpiece;

setting means for setting a desired pressure value, said desired pressure value being lower than a maximum pressure value of the sequential pressure values detected by at least one of said pressure sensors;

comparing means for comparing a pressure value produced from said at least one pressure sensor with said desired pressure value;

means for determining that said vacuum unit has been brought to an improper state based on a result of said comparison of the pressure value produced from said at least one pressure sensor with said desired pressure value;

means for determining a failure point in said vacuum unit in response to a determination of an improper state of said vacuum unit, said means for determining a failure point in said vacuum unit comprising:

means for determining a differential pressure between further pressure values detected by a pair of said plurality of pressure sensors disposed respectively on upstream and downstream sides of at least one of said components;

means for comparing said differential pressure with a predetermined threshold value; and displaying means for displaying information about said failure point based on a result of the comparison of said differential pressure and said predetermined threshold value.

5. A system according to claim 4, wherein pressure sensors are provided on a fluid supply side corresponding to the upstream side of said at least one component and a fluid intake side corresponding to the downstream side of said at least one component respectively.

6. A system according to claim 5, wherein said setting means is capable of setting a flow rate of air and a flowmeter is provided on said fluid intake side corresponding to the downstream side of said at least one component.

7. A system according to claim 5, further including displaying means for digitally displaying at least a pressure value used for the determination of said improper state and a pressure value used for failure precognition.

8. A system according to claim 4, wherein said means for determining that said vacuum unit has been brought to an improper state includes means for counting a number of pressure values lower in vacuum than said desired pressure value and for producing a signal indicative of an improper state when said number of pressure values below said desired pressure value reaches a predetermined count.

9. A system according to claim 4 or 5, further including displaying means for digitally displaying a pressure value detected by a detecting means for detecting said pressure value.

* * * * *